US006528110B2

(12) United States Patent
Szalony

(10) Patent No.: US 6,528,110 B2
(45) Date of Patent: Mar. 4, 2003

(54) METHOD FOR UTILIZING AN ELECTRO-RHEOLOGICAL OR MAGNETO-RHEOLOGICAL SUBSTANCE IN MECHANICAL COMPONENTS

(75) Inventor: Norman Szalony, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/752,420

(22) Filed: Dec. 29, 2000

(65) Prior Publication Data

US 2003/0012871 A1 Jan. 16, 2003

(51) Int. Cl.[7] ............................................... B05D 5/12
(52) U.S. Cl. ........................ 427/58; 427/128; 427/181; 427/190; 427/191; 427/243; 427/457; 427/475; 427/547; 427/598
(58) Field of Search ........................ 427/128, 243, 427/190, 191, 181, 457, 475, 598, 547, 58

(56) References Cited

U.S. PATENT DOCUMENTS

| 2,575,360 A | 11/1951 | Rabinow | 192/21.5 |
|---|---|---|---|
| 2,661,825 A | 12/1953 | Winslow | 192/21.5 |
| 2,886,151 A | 5/1959 | Winslow | 192/21.5 |
| 5,054,593 A | 10/1991 | Carlson | 192/21.5 |
| 5,398,917 A | 3/1995 | Carlson et al. | 267/140.14 |
| 5,645,752 A | 7/1997 | Weiss et al. | 252/62.54 |
| 5,670,213 A | 9/1997 | Blair | 427/318 |
| 5,779,013 A | 7/1998 | Bansbach | 192/21.5 |
| 5,823,309 A | 10/1998 | Gopalswamy et al. | 192/21.5 |
| 5,845,752 A | 12/1998 | Gopalswamy et al. | 192/21.5 |
| 5,967,273 A | 10/1999 | Hampton | 192/21.5 |
| 5,985,168 A | 11/1999 | Phule | 252/62.52 |

FOREIGN PATENT DOCUMENTS

SU    1772481    10/1992

OTHER PUBLICATIONS

Rabinow, J., "The Magnetic Fluid Clutch," vol. 67, No. Part 2, 1948, pp. 1308–1315. (No Month avail.).
Search report in a corresponding European Application No. 01310750.3 from European Patent Office dated Apr. 15, 2002, 5 pages.
Article entitled "Commercial Magneto–Rheological Fluid Devices," by J.D. Carlson, D.M. Catanzarite, and K.A. St. Clair, from Proceedings of the 5th International Conference on Electro–Rheological Fluids, Magneto–Rheological Suspensions and Associated Technology, Jul. 10–14, 1995, pp. 20–28.
Article entitled, "Properties and Applications of Commercial Magnetorheological Fluids," by Mark R. Jolly, Jonathan W. Bender, and J. David Carlson, from SPIE 5th Annual Symposium on Smart Structures and Materials, Mar. 15, 1998.
Article entitled, "Magnetorheological Fluids: Materials, Characterization, and Devices," by Osama Ashour and Craig A. Rogers, 1996, pp. 123–130. (No month avail.).
Article entitled, "Brakes and Clutches Using ER Fluids," by Chris A. Papadopoulos, Apr. 15, 1998, pp. 719–726.

(List continued on next page.)

Primary Examiner—Bernard Pianalto
(74) Attorney, Agent, or Firm—Brinks Hofer Gilson & Lione

(57) ABSTRACT

A method for modifying a porous mechanical component by using an ER or MR substance including the steps of providing at least one porous component having a porosity sufficient to receive the MR substance within a plurality of pores and impregnating the component with the MR substance.

10 Claims, 3 Drawing Sheets

OTHER PUBLICATIONS

Article entitled, "Compensator–Based Position Control of an Electrorheological Actuator," by Z. B. Dlodlo and D. J. Brookfield, 1999, pp. 895–917. (No month avail.).

Article entitled, "Magnetorheological Fluid Based Torque Transmission Clutches," by Melek Yalcintas, 1999, pp. 563–569. (No month avail.).

Article entitled, "Design Analysis and Experimental Evaluation of an MR Fluid Clutch," by Usob Lee, Dohyun Kim, Nahmkeon Hur and Doyoung Jeon, 2000, pp. 701–707. (No month avail.).

Search report in a corresponding British patent application No. 0207866.5 from the Patent Office in Great Britain dated Jul. 23, 2002, 4 pages.

METHOD FOR UTILIZING AN ELECTRO-RHEOLOGICAL OR MAGNETO-RHEOLOGICAL SUBSTANCE IN MECHANICAL COMPONENTS

FIELD OF THE INVENTION

The invention relates generally to the field of Electro-Rheological (ER) and Magneto-Rheological (MR) fluids and powders, specifically methods of using ER and MR fluids and powders in mechanical and electrical devices.

BACKGROUND OF THE INVENTION

ER and MR fluids and powders are substances that rely on a magnetic capable media compounded in a way that allows the substance to change form from a liquid or powder state to a rigid, solid state. These materials are formed from micron-sized, magnetizable particles called fines, suspended in oil or other media. ER and MR powders consist solely of magnetizable particles.

ER and MR fluids are very similar in their operation. The main difference is that ER fluids are responsive to an electric field and MR fluids are reactive to a magnetic field. However, MR fluids do have many advantages over ER fluids, and these will be discussed later.

ER and MR fluids are typically made up of three components: the magnetic particles, a carrier fluid, and a dispersant of some sort. The magnetic particles in ER and MR fluids are called magnetic fines. These fines are normally very small iron particles, on the order of 1–10 $\mu$m. The size of the particles may vary, but it is known that while larger particles can give the ER or MR fluid a higher yield strength and therefore a greater binding capacity, larger particles also tend to settle out from the fluid quite easily. Smaller particles do not have as much of a settling out problem, but they are more temperature sensitive and tend to "cake up" more easily, which affects the fluidity of the substance. This problem of particles settling out and caking up has been addressed in a number of patents. For example, U.S. Pat. No. 5,645,752 discloses an MR fluid utilizing a thixotropic network to stabilize the particles and prevent some settling out. Methods as shown in the '752 patent allow for the use of larger particles in the fluid and thus allow for a greater yield strength. However, the need for greater yield strength is always growing, and particle size can only be increased to a certain level. A new method for increasing the strength of both ER and MR fluid is still needed.

Carrier fluids are the fluids in which the magnetic fines are suspended. In the case of an ER or MR powder, there is no fluid; the particles themselves make up the entire substance. In ER and MR fluids, the carrier fluid is normally an inexpensive, temperature stable, non-reactive substance, preferably with a high boiling point. Commonly used carrier fluids are silicone or hydrocarbon oil. The most important features of a carrier fluid are its resistance to temperature changes and the fact that it should not cause sealing problems in the mechanism in which the ER or MR fluid is used.

The last component in most ER and MR fluids is a dispersant. The dispersant prevents some settling out and caking up of the magnetic particles. Normally, structured silica, fibrous carbon, or a number of various polymers are used to perform this function.

In their liquid form, ER and MR fluids have a consistency much like common motor oil. However, when an electric charge or magnetic field is applied, the fluids change form, becoming rigid and able to bond surfaces together. This rigid bonding mechanism results from a dipole moment introduced on the magnetic particles in the fluid from the electric charge or magnetic field. The particles form chains, aligning parallel to the electric charge or magnetic field. The strength of the bonding mechanism depends on the strength of the charge or field applied to the fluid and the size of the particles. The change in viscosity of the fluid takes place in a few milliseconds. ER and MR powders operate in the same manner, changing from a powder to a rigid form. MR fluids typically exhibit much stronger yield strengths than do ER fluids. MR fluids are also more resistant to temperature changes and have a high tolerance to impurities such as water. MR fluids can also be activated using a much lower voltage power supply. ER fluids require high voltage (near 5,000 volts) to operate, and this need can cause design and safety problems. For purposes of the present disclosure, discussion herein of the terms "ER and/or MR fluids" is also meant to refer to equivalent ER or MR substances, such as powders.

Extensive research has been performed for many years to find applications for ER and MR fluids in linear and rotating actuated mechanisms. For example, use of such materials as a rigid bonding material for such applications would provide a unique and effective solution to braking, power generation and other mechanical systems. U.S. Pat. Nos. 2,575,360, 2,661,825, and 2,886,151 disclose examples of devices using ER or MR substances to control such functions. One hindrance in such developments has been that the amount of electrical power required for the fluid to achieve its desired functionality as a binding material has been too great for practical use. As mentioned above it is possible to achieve stronger yield strengths by using ER and MR fluids with larger particles, but this results in the need to control the settling out of these larger particles. Using dispersants can accomplish this, but this increases the cost of the fluids and makes manufacturing them more complicated. As a result, the potential of ER and MR fluids as a rigid bonding mechanism in hydraulic and mechanical applications has been limited and there is a need to increase the functionality of these fluids without increasing their cost or complexity.

The impregnation of porous parts with oil has been a common practice in forming self-lubricating bearings and other parts. Since 1965, Chrysler has used a method to pull oil lubricant into porous bronze parts in order to maintain lubricity. However, the oil did not have the characteristics of ER and MR fluids in that it could only be used as lubrication, not as a holding mechanism. In later years, a similar method was used to mold a Teflon layer to a porous bronze layer. Again, Teflon acts as a good lubricant, but it has no shear strength, and cannot be used to hold parts in place.

BRIEF SUMMARY OF THE INVENTION

The present invention may be embodied in a method for modifying a porous mechanical component by using an ER or MR substance. Preferably, the ER or MR substance is a fluid, but alternatively, it is possible to perform the method using an ER or MR powder.

In a first embodiment of the invention, a method for modifying a porous mechanical component using an MR substance is provided. The method includes the steps of providing at least one porous component having a porosity sufficient to receive the MR substance within a plurality of pores and impregnating the component with the MR substance.

In a second embodiment of the invention, a method for associating an amount of MR substance with at least two porous mechanical components is provided. The method includes the steps of providing at least one porous component having a porosity sufficient to receive the MR substance within a plurality of pores and impregnating the component with the MR substance.

In a third embodiment of the invention, a method for using an MR substance to releasably bind at least two porous mechanical components is provided. The method includes the steps of providing at least two porous components having a porosity sufficient to receive the MR substance within a plurality of pores and impregnating the components with the MR substance. The components are then placed such that the impregnated surfaces are in contact with each other and a magnetic field is applied to the components and the MR substance.

In a fourth embodiment of the invention, a method for using an MR substance to releasably bind at least two porous mechanical components is provided. The method includes the steps of providing at least two porous components having a porosity sufficient to receive the MR substance within a plurality of pores and impregnating the components with the MR substance. The components are then placed such that the impregnated surfaces are in contact with each other and a magnetic field is applied to the components and the MR substance. The magnetic field is then removed from the components and the MR substance.

In a fifth embodiment of the invention, a method for modifying a porous mechanical component using an ER substance is provided. The method includes the steps of providing at least one porous component having a porosity sufficient to receive the ER substance within a plurality of pores and impregnating the component with the ER substance.

In a sixth embodiment of the invention, a method for associating an amount of ER substance with at least two porous mechanical components is provided. The method includes the steps of providing at least two porous components having a porosity sufficient to receive the ER substance within a plurality of pores and impregnating the components with the ER substance.

In a seventh embodiment of the invention, a method for using an ER substance to releasably bind at least two porous mechanical components is provided. The method includes the steps of providing at least two porous components having a porosity sufficient to receive the ER substance within a plurality of pores and impregnating the components with the ER substance. The components are then placed such that the impregnated surfaces are in contact with each other and an electric charge is applied to the components and the ER substance.

In an eighth embodiment of the invention, a method for using an ER substance to releasably bind at least two porous mechanical components is provided. The method includes the steps of providing at least two porous components having a porosity sufficient to receive the ER substance within a plurality of pores and impregnating the components with the ER substance. The components are then placed such that the impregnated surfaces are in contact with each other and an electric charge is applied to the components and the ER substance. The electric charge is then removed from the components and the ER substance.

The present invention provides a number of advantages over the prior art. By using this method, an ER or MR fluid may be used to bind mechanical parts together without necessitating large amounts of electricity needed to activate the fluid. In the past, in order to get ER or MR fluid to adequately hold two components together, the electric charge or magnetic field had to be very strong. Using this method, the ER or MR fluid is allowed to interact with the internal structure of the mechanical components, forming a three-dimensional structure that is much stronger than the ER or MR fluid alone.

Another advantage to the present invention is that the method allows the use of less of the ER or MR fluid to get the same amount of binding strength. The efficiency of the ER or MR fluid's binding feature is greatly improved using this method.

It is to be understood that both the preceding summary and the following detailed description are intended to be exemplary and are intended to provide a further explanation of the invention claimed. The invention will best be understood by reference to the following detailed description read in conjunction with the accompanying drawings.

DETAILED DESCRIPTION OF THE INVENTION

Figure 1:
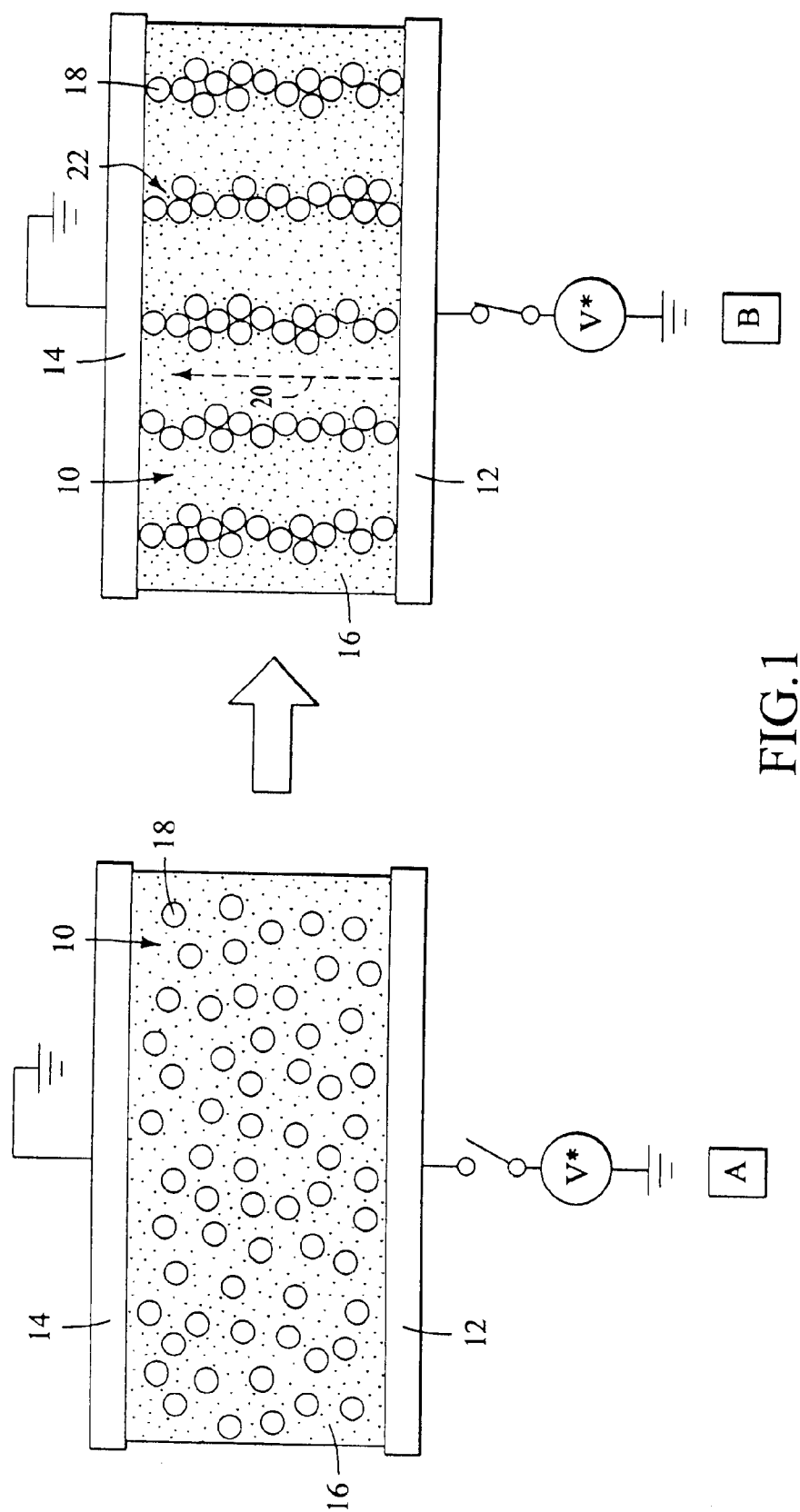
FIG. 1 shows an enlarged view of the interaction of the particles in an ER or MR fluid without an electric charge or magnetic field applied and then with an electric charge or magnetic field applied.

Referring to FIG. 1, the general mechanism of an ER or MR fluid is shown. The fluid 10 is located between a first 12 and a second 14 electrode. These electrodes 12, 14 may be any type of conducting material. The fluid 10 is made up of a medium 16 and a plurality of particles 18, which are reactive to either an electric charge or a magnetic field. In the off position A. the particles 18 are evenly dispersed throughout the medium 16 in a substantially random manner. In the off position A, the fluid 10 acts like a liquid, and flows freely between the electrodes 12, 14.

When the circuit is turned to the on position B, a dipole moment is introduced to the particles 18, causing them to align in the direction of the electric charge or magnetic field. An arrow 20 in FIG. 1 shows the direction of alignment. The lines 22 of particles 18 cause the fluid 10 to approach solid form and develop a thick consistency. When the electric charge or magnetic field is removed, the particles 18 return to their random arrangement and the fluid 10 becomes a liquid once again. This characteristic of ER and MR fluids allows them to be used in many mechanisms where bonding or friction is needed. However, the binding strength of the solid formed by the fluids may not be strong enough to adequately bind two surfaces together unless very large particles 18 or a very high-energy source are used.

Figure 2:
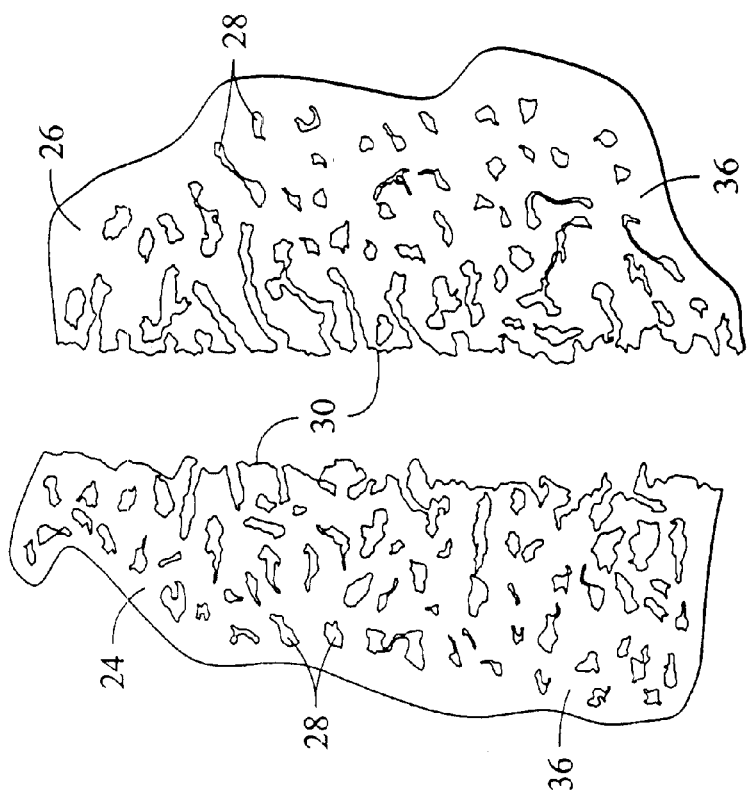
FIG. 2 shows an enlarged view of a cross-section of the structure of a porous component that may be utilized in accordance with the present invention.

Referring to FIG. 2, this invention is first embodied as a method of using porous components 24, 26 along with ER or MR fluid to boost the binding strength of the fluid 10 without enlarging the particles 18 or increasing the amount of power used. The ER or MR fluid 10 is provided with porous components 24, 26, preferably made of powder metal substrates with which to interact. As is well known in the art, the process of forming powder metal components 24, 26 is performed by grinding up metal into a fine powder and then pressure molding the powder back into a solid component substrate. This process results in components 24, 26 having a multitude of pores 28 in their structure and surface 30. These pores 28 provide spaces for the ER or MR fluid 10 to be retained within the substrates of the components 24, 26.

Figure 3:
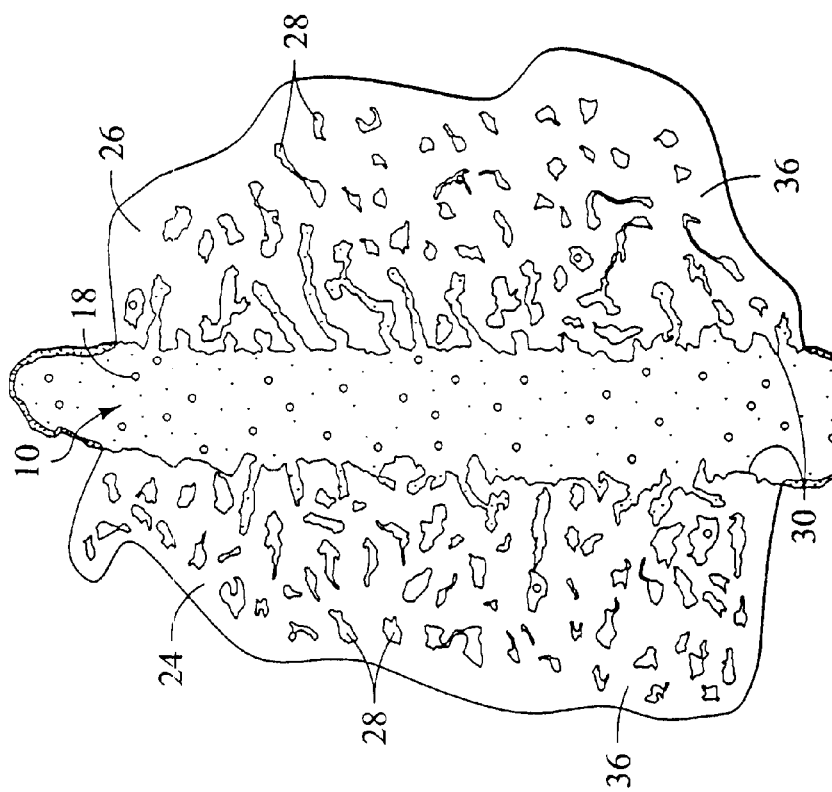
FIG. 3 shows a cross-section of the present method of two porous components impregnated with ER or MR fluid and a layer of ER or MR fluid between them in an inactivated state that may be utilized in accordance with the present invention.

Referring to FIG. 3, the invention may be embodied in a method of having ER or MR fluid interact with the pores 28 of powder metal components 24, 26. The fluid 10 may be impregnated into the components 24, 26 by a number of different methods. The fluid 10 could be impregnated by being pulled into the pores 28 of the components 24, 26 using a vacuum or a magnetic field. Alternatively, the fluid 10 could be impregnated into the components 24, 26 by being mechanically squeezed into the pores 28 or hydraulically ingested. When the effect of any singular or combination of the above methods is removed from the fluid 10 and the components 24, 26, the fluid 10 and the particles 18 become lodged therein. A layer 32 of the ER or MR fluid may also be added between the components 24, 26.

Figure 5:
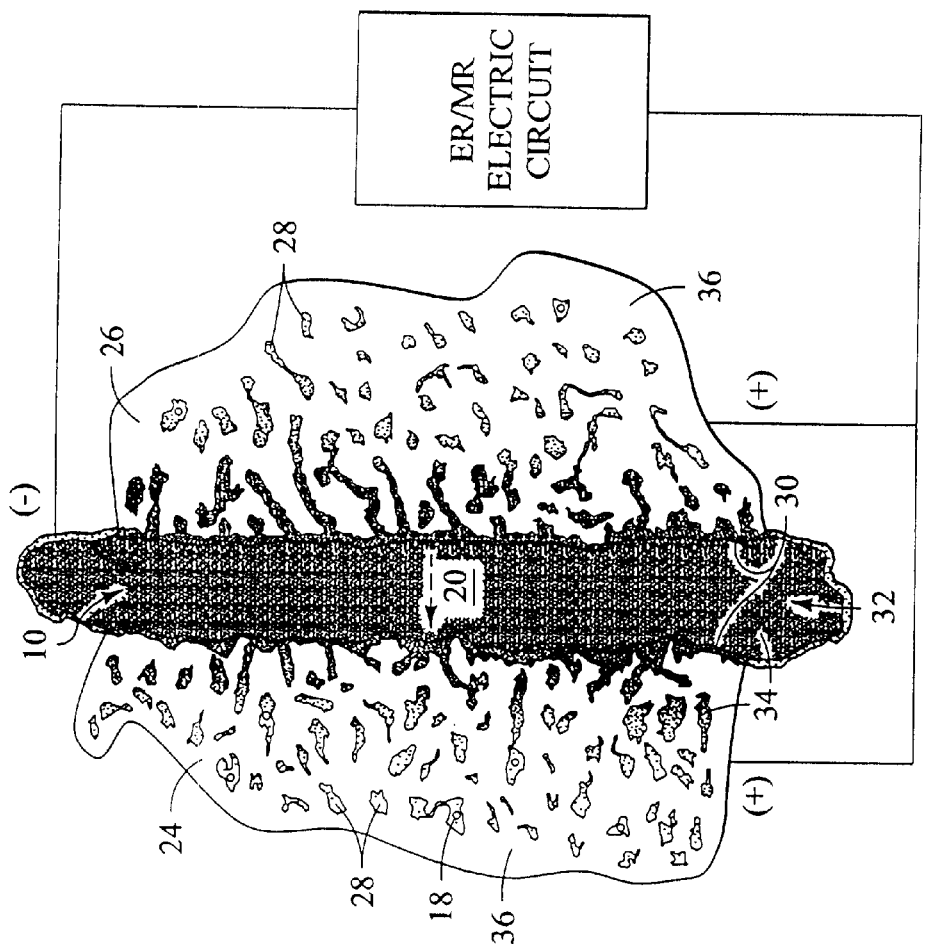
FIG. 5 is a schematic example of the connection of an electric circuit to the components from FIGS. 3 and 4 with an electric charge or magnetic field applied.
Figure 4:
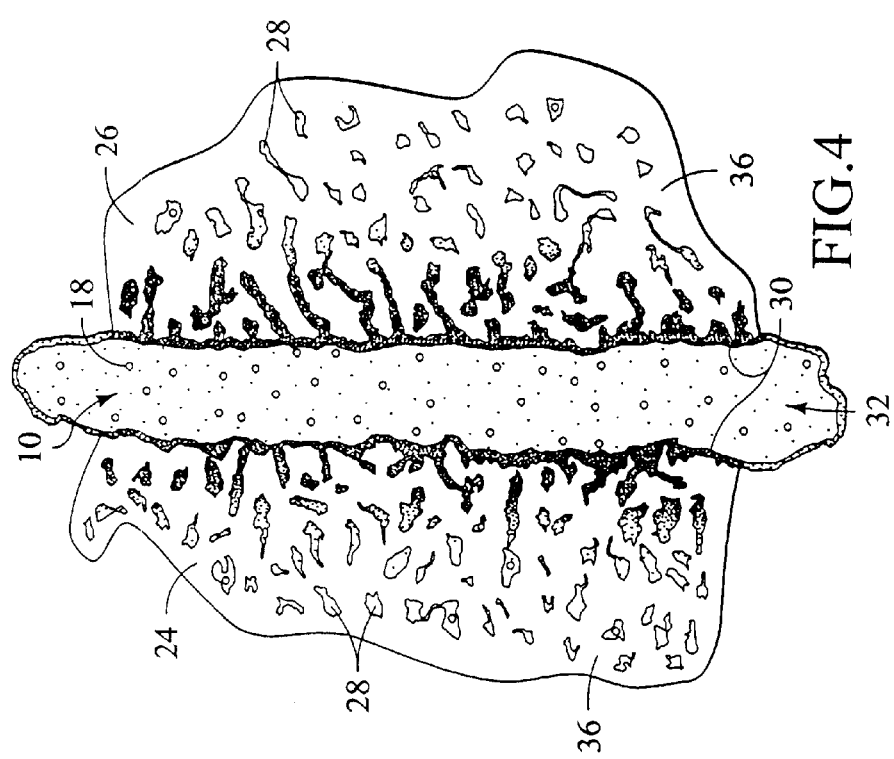
FIG. 4 is the same as FIG. 3, but with a low-level electric charge or magnetic field applied, showing the interaction of the particles with the pores of the components.

Referring in combination to FIGS. 3, 4 and 5, the mechanism of FIG. 1 is shown along with the preferred embodiment of the present invention. Preferably, powder metal components 24, 26 are impregnated with ER or MR fluid 10 such that the fluid 10 and the particles 18 are embedded within the pores 28 of the components 24, 26. In FIG. 3, the fluid 10 is in its liquid form. FIG. 4 shows the preferred embodiment of the method without a circuit present while FIG. 5 shows a schematic of a circuit attached to the components 24, 26. It is important to note that ER fluid requires an electric charge to change forms while MR fluid requires a magnetic field. The proper charge or field should be used depending on the substance impregnated within the components 24, 26. The mechanism of each type of fluid is the same when the appropriate charge or field is applied.

When the electric charge or magnetic field is applied to the components 24, 26 as shown in FIG. 5, the particles 18 in the fluid 10 align in the direction of the electric charge or magnetic field. An arrow 20 shows the direction of alignment. This causes the ER or MR fluid 10 to act as a solid, shown by the shaded areas 34 in FIGS. 4 and 5. FIG. 4 actually shows the fluid 10 with a low-level electric charge or magnetic field applied to it such that the main layer 32 has not yet begun to change form. Only the fluid 10 and the particles 18 on the surface 30 have become solid. The fact that the fluid 10 and particles 18 have been impregnated into the pores 28 of the components 24, 26 allows the fluid 10 to take advantage of the structure of the components 24, 26 and increase its binding strength. Instead of relying only on the shear strength of the fluid 10 itself, the fluid 10 forms a three-dimensional interface with the porous interior 36 of the components 24, 26. This greatly increases the bonding strength of the fluid 10 and allows for the use of smaller particles 18, less fluid 10, less dispersant, and a lower voltage electric charge or magnetic field.

An advantage of the present invention is the fact that since less power and fluid may be used to produce the same level of binding strength, the costs of using these types of mechanisms is reduced. Another advantage is that the higher binding strength allows mechanisms that were not possible in the past to be performed. The voltage needed is lowered, making safer and smaller mechanisms possible and lowering the cost of running these mechanisms. Additionally, it will now be possible to use less fluid 10 to perform the same functions as in the past.

It should be noted that there could be a wide range of changes to the claimed method. For instance, ER or MR powder could be used instead of fluid 10. Also, any size particles 18 could be used, and the size of the pores 28 in the components 24, 26 would have to be adequately adjusted. Any material could be used for the porous components 24, 26, not necessarily only powder metal. The circuits shown in FIGS. 1 and 5 are meant to be illustrative, the actual circuit could have any arrangement, so long as an electric charge or magnetic field is applied to the ER or MR fluid 10. Any number of parts could be used with the method. Additionally, the circuit could be reversed such that when the circuit is turned off, the fluid reverts to its solid form rather than its liquid form. Thus, it is intended that the foregoing detailed description be regarded as illustrative rather than limiting and that it be understood that it is the following claims, including all equivalents, which are intended to define the scope of the invention.

What is claimed is:

1. A method for modifying a mechanical component having a porous substrate using a magneto-rheological substance, said method comprising the steps of:

providing at least one porous substrate having a porosity sufficient to receive said magneto-rheological substance within a plurality of pores; and impregnating said at least one porous substrate with said magneto-rheological substance such that said magneto-rheological substance is integrated into the porous structure of said at least one component.

2. A method as in claim 1, wherein said magneto-rheological substance is a powder made up of magnetic fines.

3. A method as in claim 1, wherein said magneto-rheological substance is made up of magnetic fines suspended in a fluid.

4. A method for associating an amount of magneto-rheological substance with at least two mechanical components having porous substrates, said method comprising the steps of:

providing at least two porous substrates having a porosity sufficient to receive said magneto-rheological substance within a plurality of pores; and impregnating said at least two porous substrates with said magneto-rheological substance such that said magneto-rheological substance is integrated into the porous structures of said at least two components.

5. A method as in claim 4, wherein said magneto-rheological substance is a powder made up of magnetic fines.

6. A method as in claim 4, wherein said magneto-rheological substance is made up of magnetic fines suspended in a fluid.

7. A method for modifying a mechanical component having a porous substrate using an electro-rheological substance, said method comprising the steps of:

providing at least one porous substrate having a porosity sufficient to receive said electro-rheological substance within a plurality of pores; and impregnating said at least one porous substrate with said electro-rheological substance such that said electro-rheological substance is integrated into the porous structure of said at least one component.

8. A method for associating an amount of electro-rheological substance with at least two mechanical components having porous substrates, said method comprising the steps of:
- providing at least two porous substrates having a porosity sufficient to receive said electro-rheological substance within a plurality of pores; and
- impregnating said at least two porous substrates with said electro-rheological substance such that said electro-rheological substance is integrated into the porous structures of said at least two components.

9. A method for modifying a porous mechanical component having a substrate using a magneto-rheological substance, said method comprising the steps of:
- providing at least one porous component having a substrate with a porosity sufficient to receive said magneto-rheological substance within a plurality of said pores; and
- impregnating said at least one porous component with said magneto-rheological substance such that said magneto-rheological substance is integrated into the porous structure of the substrate of said at least one porous component.

10. A method for modifying a porous mechanical component using an electro-rheological substance, said method comprising the steps of:
- providing at least one porous component having a porosity sufficient to receive said electro-rheological substance within a plurality of said pores; and
- impregnating said at least one porous component with said electro-rheological substance such that said electro-rheological substance is integrated into the porous structure of said at least one porous component.

* * * * *